(12) United States Patent
Everhart et al.

(10) Patent No.: US 9,908,626 B2
(45) Date of Patent: Mar. 6, 2018

(54) CONTROLLING IN FLIGHT ENTERTAINMENT SYSTEM USING POINTING DEVICE INTEGRATED INTO SEAT

(71) Applicant: Thales Avionics, Inc., Irvine, CA (US)

(72) Inventors: Jeffrey S. Everhart, Winston-Salem, NC (US); Lori Elizabeth Salazar, Mission Viejo, CA (US); John Howard Darvell, Claremont, CA (US)

(73) Assignee: Thales Avionics, Inc., Irvine, CA (US)

( * ) Notice: Subject to any disclaimer, the term of this patent is extended or adjusted under 35 U.S.C. 154(b) by 25 days.

(21) Appl. No.: 15/091,299

(22) Filed: Apr. 5, 2016

(65) Prior Publication Data

US 2016/0297527 A1    Oct. 13, 2016

Related U.S. Application Data

(60) Provisional application No. 62/146,001, filed on Apr. 10, 2015.

(51) Int. Cl.
*B64D 11/00* (2006.01)
*G06F 3/044* (2006.01)

(52) U.S. Cl.
CPC .. *B64D 11/00155* (2014.12); *B64D 11/00151* (2014.12); *G06F 3/044* (2013.01); *G06F 2203/04108* (2013.01)

(58) Field of Classification Search
CPC . G06F 3/044; G06F 3/0416; B64D 11/00155; B64D 11/00151
See application file for complete search history.

(56) References Cited

U.S. PATENT DOCUMENTS

| | | | |
|---|---|---|---|
| 9,108,733 B2* | 8/2015 | Sizelove | B64D 11/0015 |
| 2005/0268319 A1* | 12/2005 | Brady, Jr. | B60N 2/4693 |
| | | | 725/76 |
| 2010/0060739 A1* | 3/2010 | Salazar | B64D 11/0015 |
| | | | 348/148 |
| 2012/0066726 A1* | 3/2012 | Mondragon | B64D 11/0015 |
| | | | 725/76 |

* cited by examiner

*Primary Examiner* — Latanya Bibbins
(74) *Attorney, Agent, or Firm* — Sage Patent Group

(57) ABSTRACT

An entertainment system includes a video display unit facing a passenger seat and a track pad assembly integrated with an armrest of the passenger seat. The track pad assembly includes a track pad that is operable to control the video display unit.

15 Claims, 17 Drawing Sheets

CONTROLLING IN FLIGHT ENTERTAINMENT SYSTEM USING POINTING DEVICE INTEGRATED INTO SEAT

RELATED APPLICATIONS

This application claims priority to U.S. Provisional Application No. 62/146,001, filed Apr. 10, 2015, the disclosure of which is incorporated by reference in its entirety.

BACKGROUND

It may be desirable to integrate a pointing device into an armrest of an aircraft seat to provide comfortable and intuitive control of an In Flight Entertainment (IFE) system.

SUMMARY

In accordance with some embodiments of the invention, an entertainment system includes a video display unit facing a passenger seat and a track pad assembly integrated with an armrest of the passenger seat. The track pad assembly includes a track pad that is operable to control the video display unit.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

Although various embodiments of the present invention are explained herein in the context an in-flight entertainment (IFE) environment, other embodiments of entertainment systems and related controllers are not limited thereto and may be used in other environments, including other vehicles such as ships, submarines, buses, trains, commercial/military transport aircraft, and automobiles, as well as buildings such as conference centers, sports arenas, hotels, homes, etc. Accordingly, in some embodiments users are referred to, in a non-limiting way, as passengers.

Some IFE systems include in-seat monitors with touch-screen interfaces. Some other IFE systems include passenger controller units (e.g., remote controls) that may be fixed or tethered to the seat area. Some passenger controller units include hard button interfaces and some other passenger controller units include touch-screen interfaces similar to a mobile phone.

When touch-screen interfaces are placed in seatbacks of premium and business class seating of an aircraft, the touch-screen interfaces can be located too far away from the facing passengers to be conveniently reached. Moreover, touch-screen interfaces in seatbacks of coach class seating can be difficult to reach when the passengers' seats are reclined. In any case, the touch-screen interfaces can tire the passenger's arm, particularly on longer flights and/or when the passenger uses the touch-screen interface for an extended period of time.

Passenger controller units can add weight, power consumption and cost. The passenger controller units can also take up extra space. The controls can be complex and difficult to understand for users who are not familiar with the controls. Moreover, the passenger may need to repeatedly look down at the controller unit and up at the video display unit, which can cause frustration and possible neck discomfort.

In view of these shortcomings of known interfaces, embodiments of the invention are directed to pointing devices that are integrated into a portion of the seat such as the armrest. The pointing device may be similar to pointing devices commonly found in consumer electronic products and therefore may be intuitive to use. For example, the pointing device may be a touch pad or track pad, a track point, a trackball or a joystick.

Figure 1:
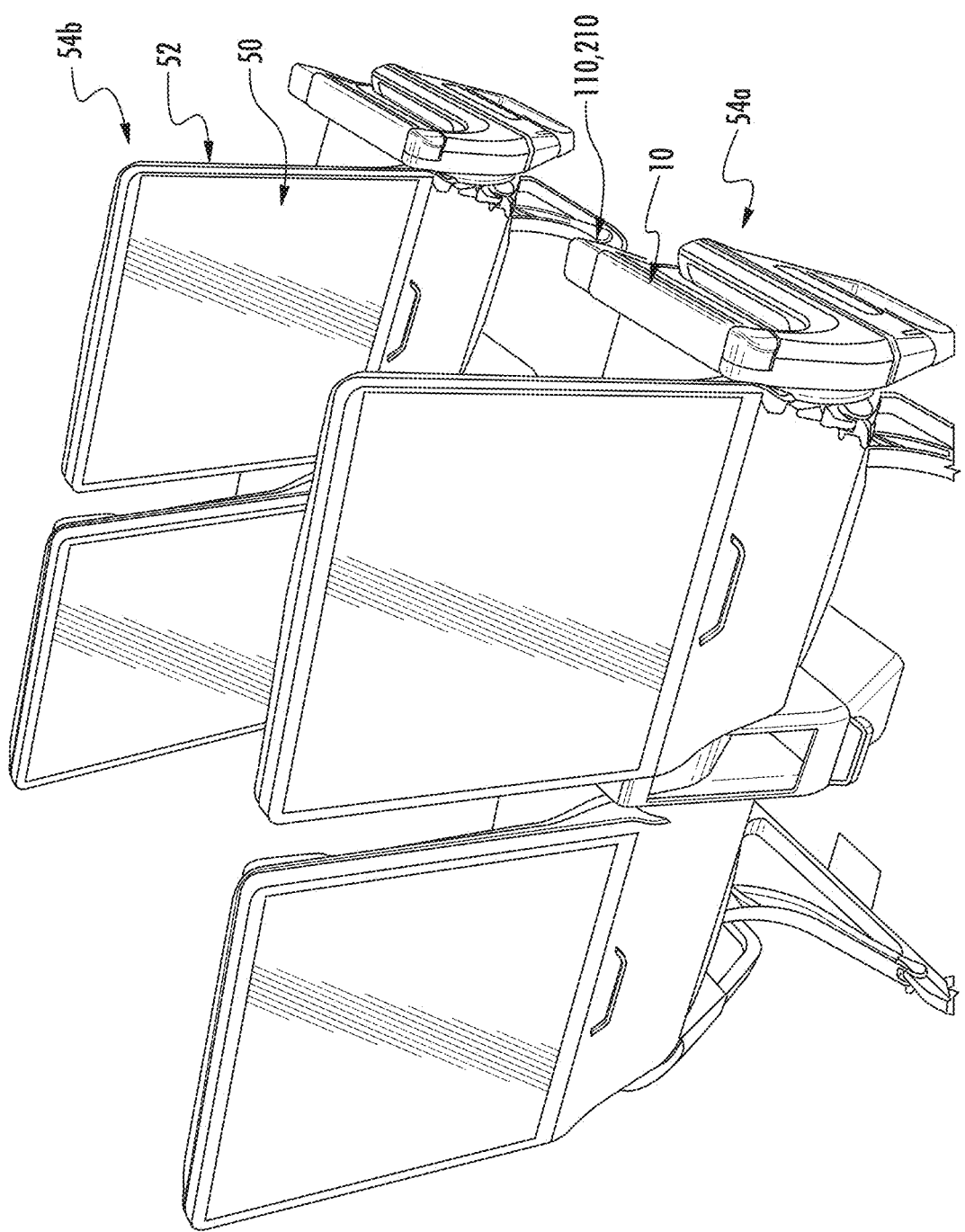
FIG. 1 is a perspective view of an entertainment system according to some embodiments.

FIG. 1 illustrates an entertainment system 1 according to some embodiments. The entertainment system 1 may be an in-flight entertainment system. The entertainment system 1 includes a video display unit 50 that faces a passenger seat 54a. The video display unit 50 may be in a seatback 52 of a passenger seat 54b that is directly in front of the passenger seat 54a. The entertainment system 1 includes a track pad assembly 110 or 210 that is integrated with an armrest 10 of the passenger seat 54a. The track pad assembly 110 or 210 includes a track pad that is operable to control the video display unit 50.

Figure 2:
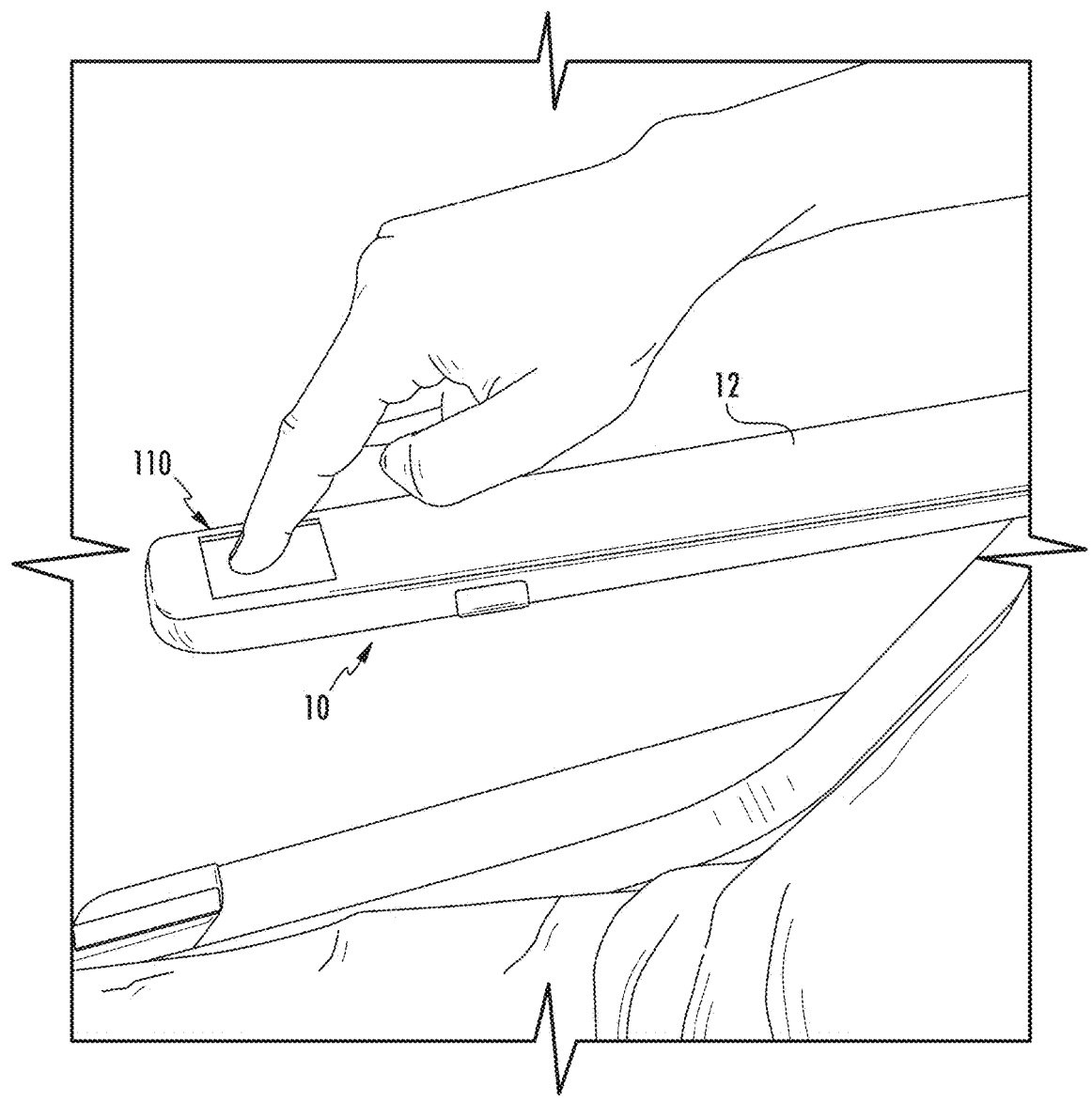
FIG. 2 is a fragmentary perspective view of a track pad assembly integrated into an armrest of an aircraft seat in accordance with some embodiments.

Referring to FIG. 2, the pointing device may be a track pad or track pad assembly 110 integrated into a seat armrest 10. An advantage of this embodiment is that the integrated track pad assembly 110 does not take up extra space. Moreover, the track pad assembly 110 facilitates user comfort (e.g., the passenger can rest his or her elbow and/or forearm on the armrest while operating the track pad with his or her fingers).

Figure 3:
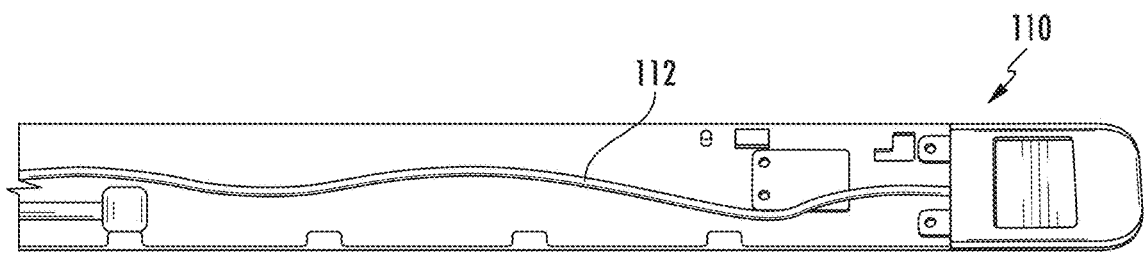
FIG. 3 is a fragmentary top view illustrating the track pad and armrest of FIG. 1 with the armcap removed.

FIG. 3 illustrates the track pad assembly 110 with the armrest armcap 12 (FIG. 2) removed. The track pad assembly 110 may include a cable 112 that runs along the seat arm to provide power to the track pad and/or to communicate with the other components of the IFE system.

Figure 4:
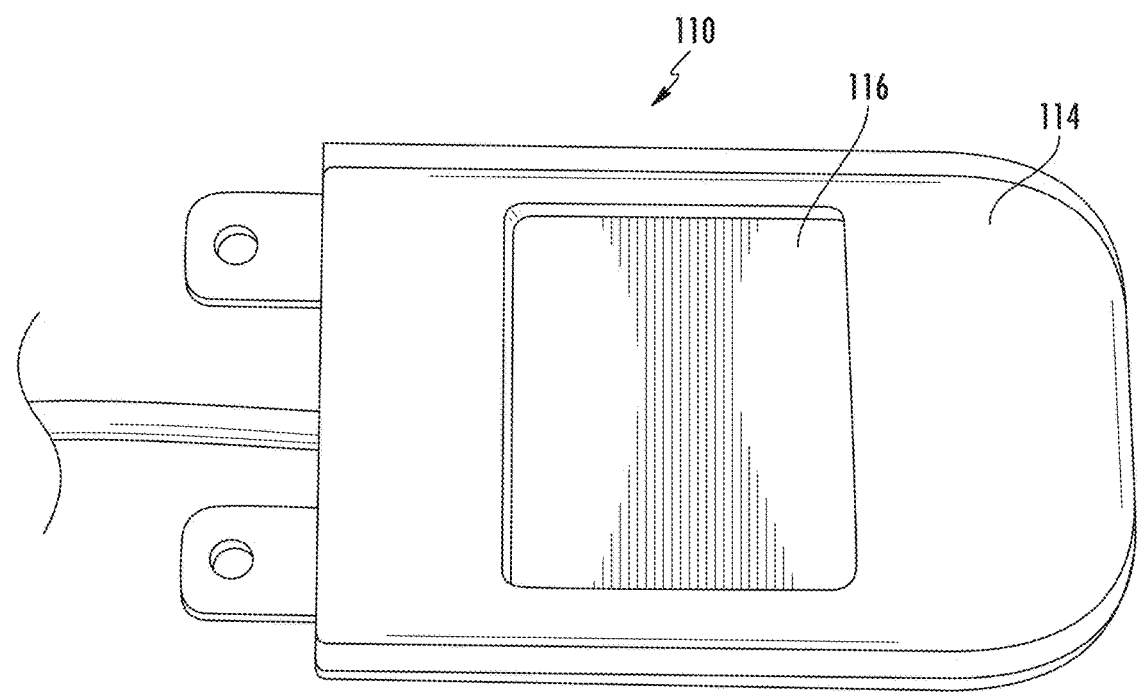
FIG. 4 is a top assembled view of the track pad assembly of FIG. 2.
Figure 5:
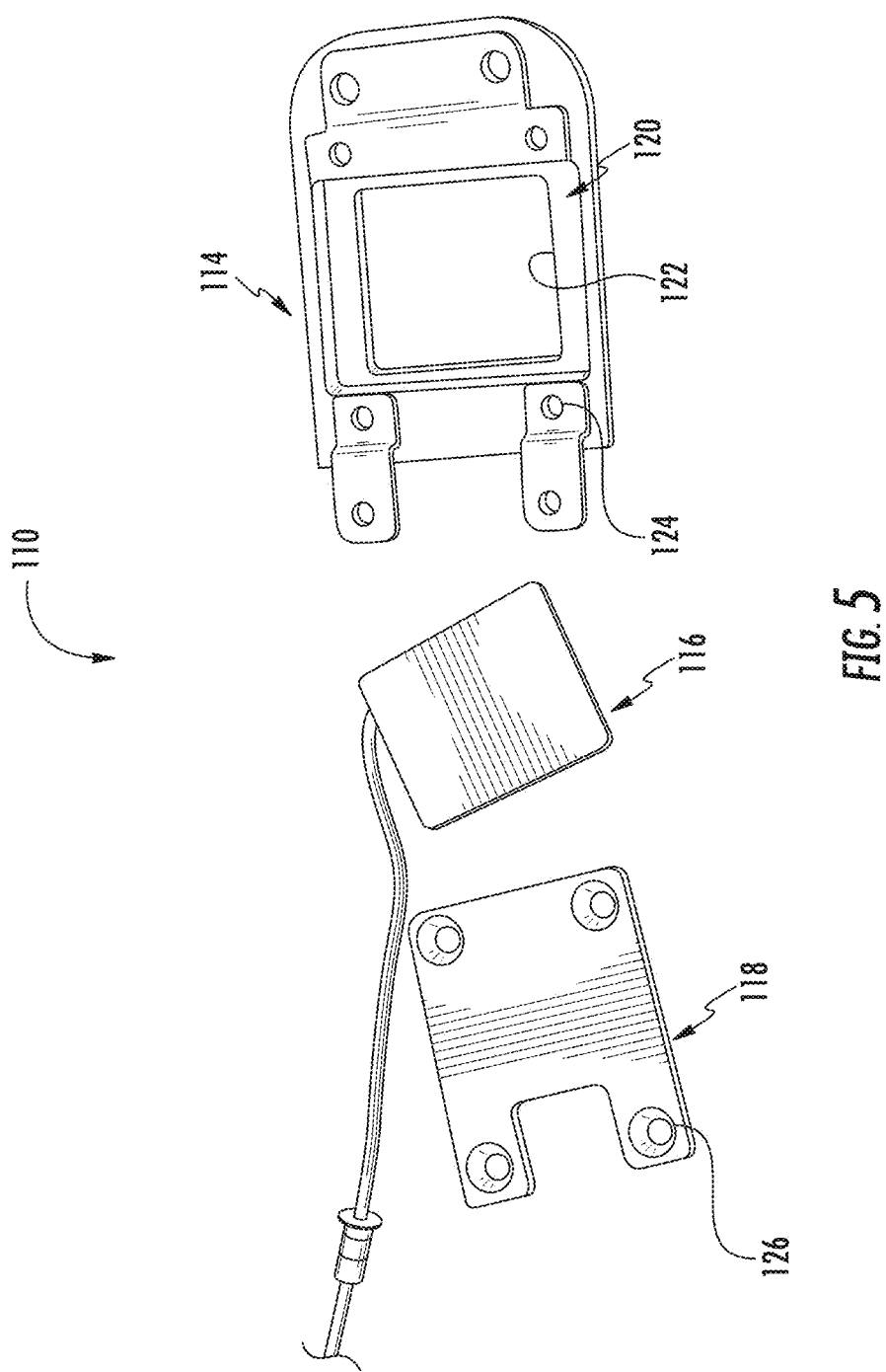
FIG. 5 is a bottom exploded view of the track pad assembly of FIG. 2.

Referring to FIGS. 4 and 5, the track pad assembly 110 may include a frame or housing 114, a sensor 116 and a base plate 118. The frame 114 may be sized and configured to fit around and/or over an end portion of the armrest. The frame 114 may include a recessed portion 120 sized and configured to receive the sensor 116. The frame 114 may include an opening 122 that provides user access to the sensor 116.

Figure 6:
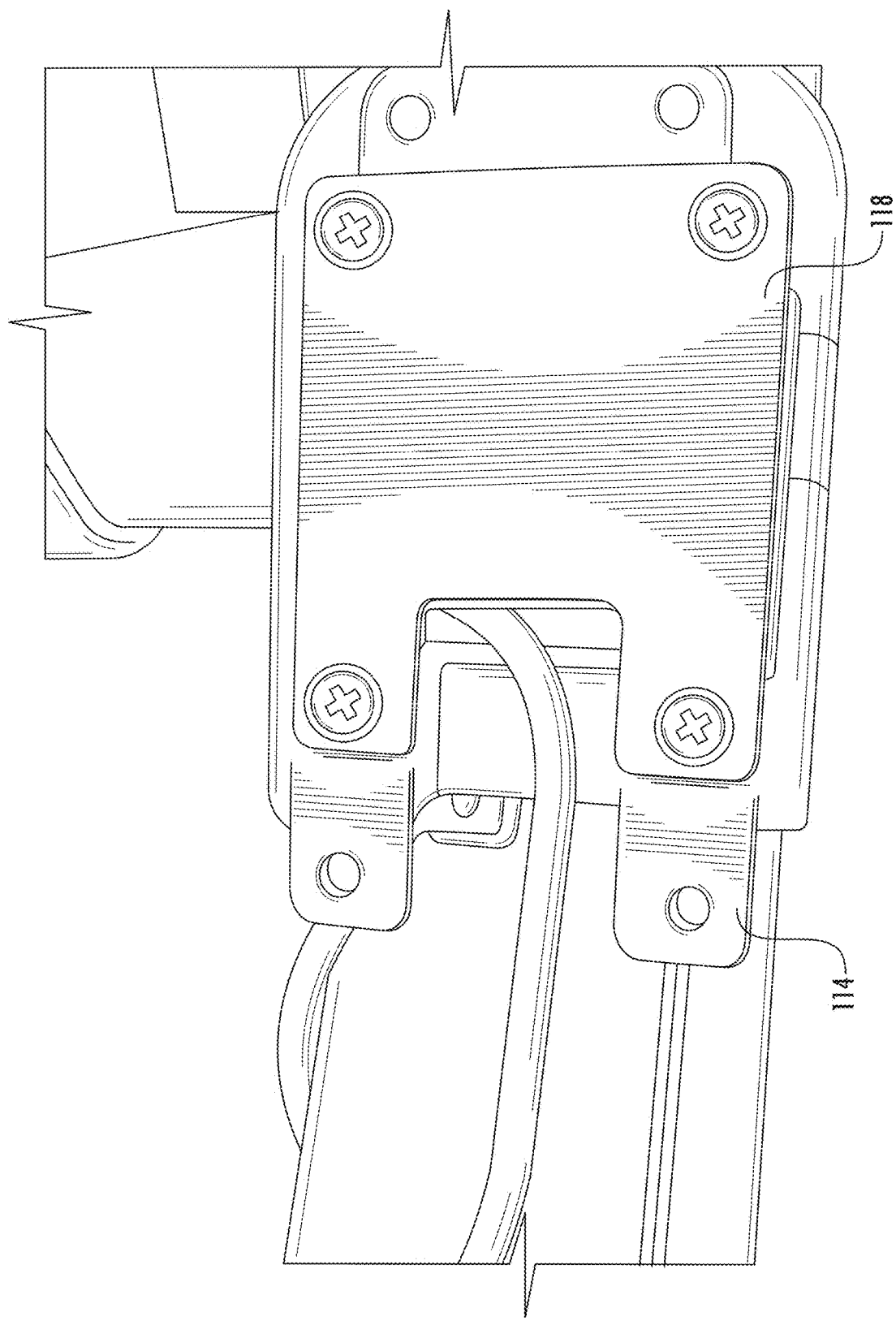
FIG. 6 is a fragmentary bottom view of the track pad assembly of FIG. 2 connected to the armrest.

The base plate 118 may be connected to the frame 114 to hold the sensor 116 in the recess 120 of the frame 114. As illustrated in FIGS. 5 and 6, the frame 114 may include a plurality of apertures 124 and the base plate 118 may include a plurality of apertures 126; these apertures may be aligned and fasteners may be received therethrough to connect the frame 114 and the base plate 118.

A track pad or track pad assembly 210 according to some other embodiments is illustrated in FIGS. 7-10. Like the track pad 110, the track pad 210 is integrated into an aircraft seat armrest 10. However, unlike the track pad 110, the sensor plate 216 of the track pad 210 is positioned under an upper armrest structure 215 of the armrest 10. That is, the track pad 210 is covered by the upper armrest structure 215. This may be advantageous in that the track pad 210 is protected from debris and liquid which may increase the life of the track pad 210. In some embodiments, and as described below, the track pad sensor 216 is positioned under an escutcheon or end cap 214, which forms a portion of the upper armrest structure 215.

Figure 8:
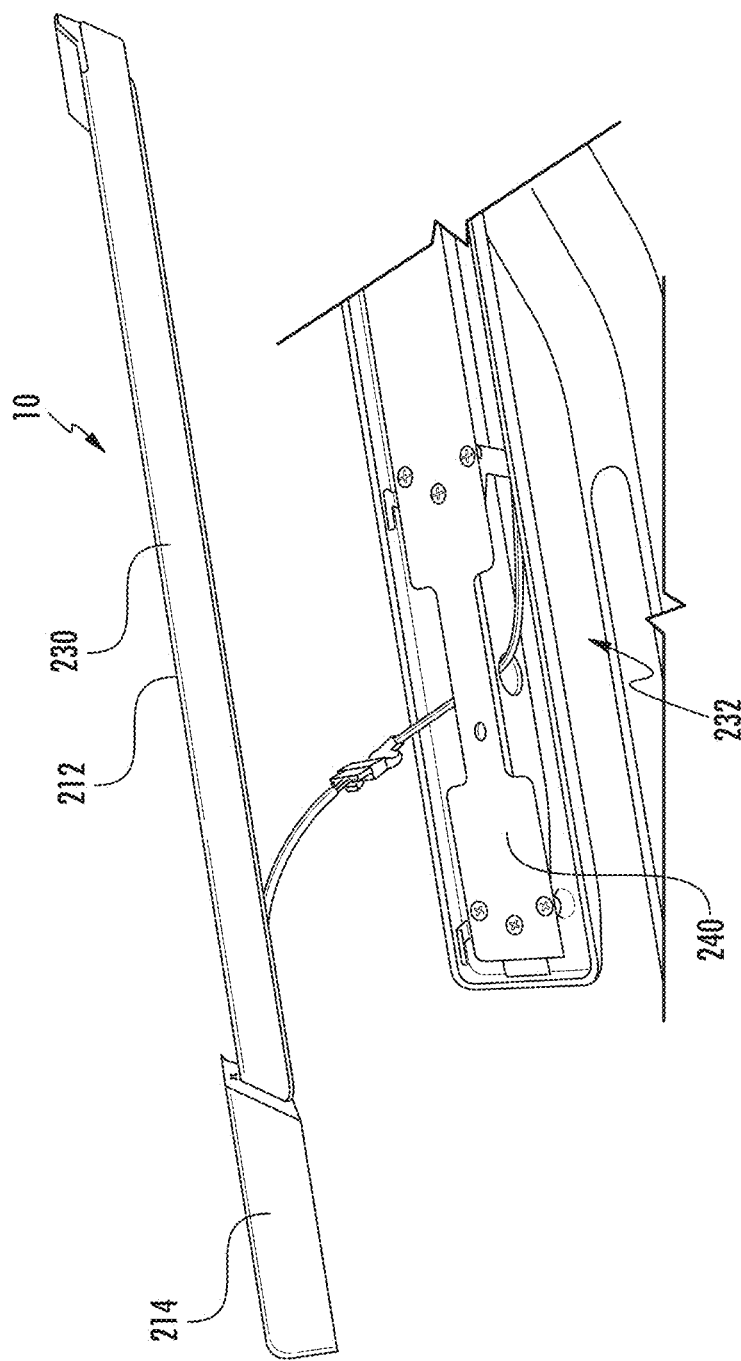
FIG. 8 is an exploded perspective view of the armrest and track pad assembly of FIG. 7 with the track pad held in an upper armrest structure.

The upper armrest structure 215 includes an armcap 212 and the escutcheon 214. The armcap 212 may be padded and may also be referred to herein as the arm pad structure 212. Referring to FIG. 8, the armrest 10 includes the upper armrest structure 215 and a lower armrest structure 232 to which the upper armrest structure is releasably attached in FIG. 6.

Figure 9:
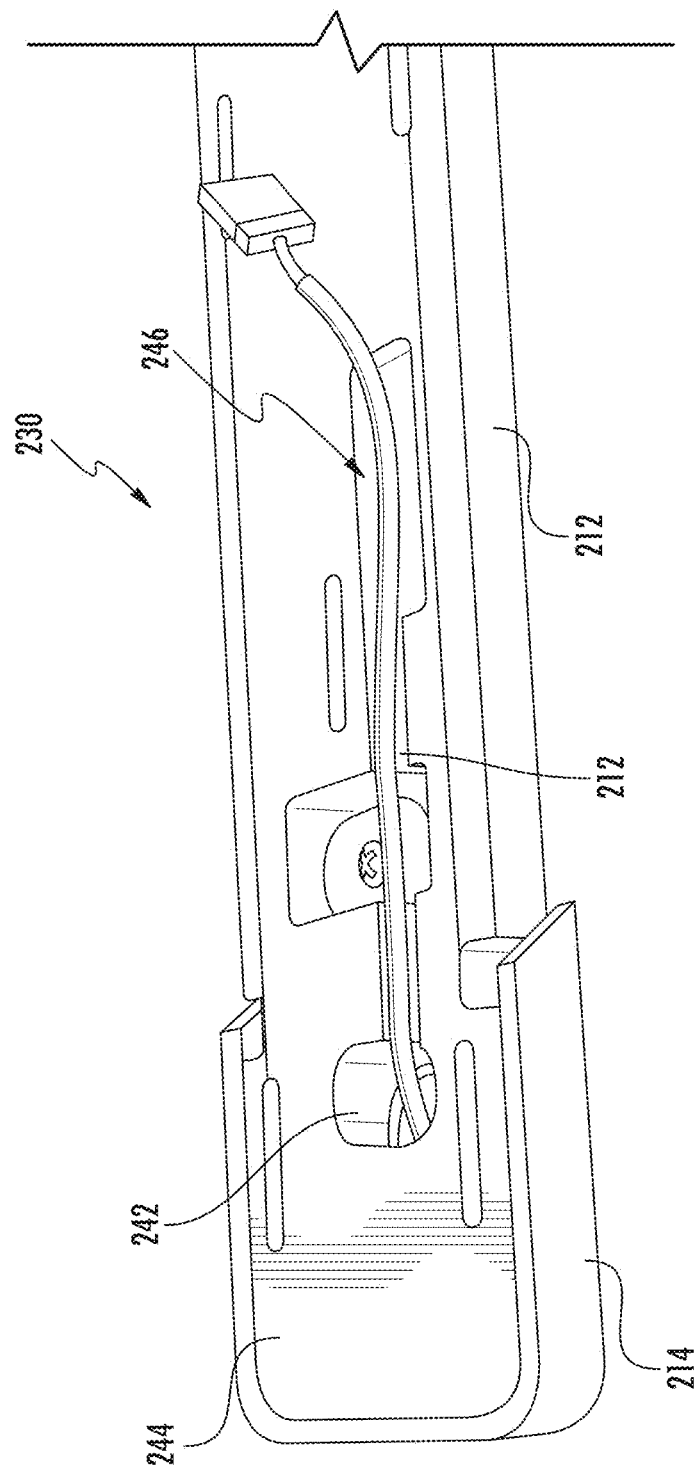
FIG. 9 is a bottom fragmentary perspective view of the upper armrest structure and the track pad assembly held therein of FIG. 8.
Figure 10:
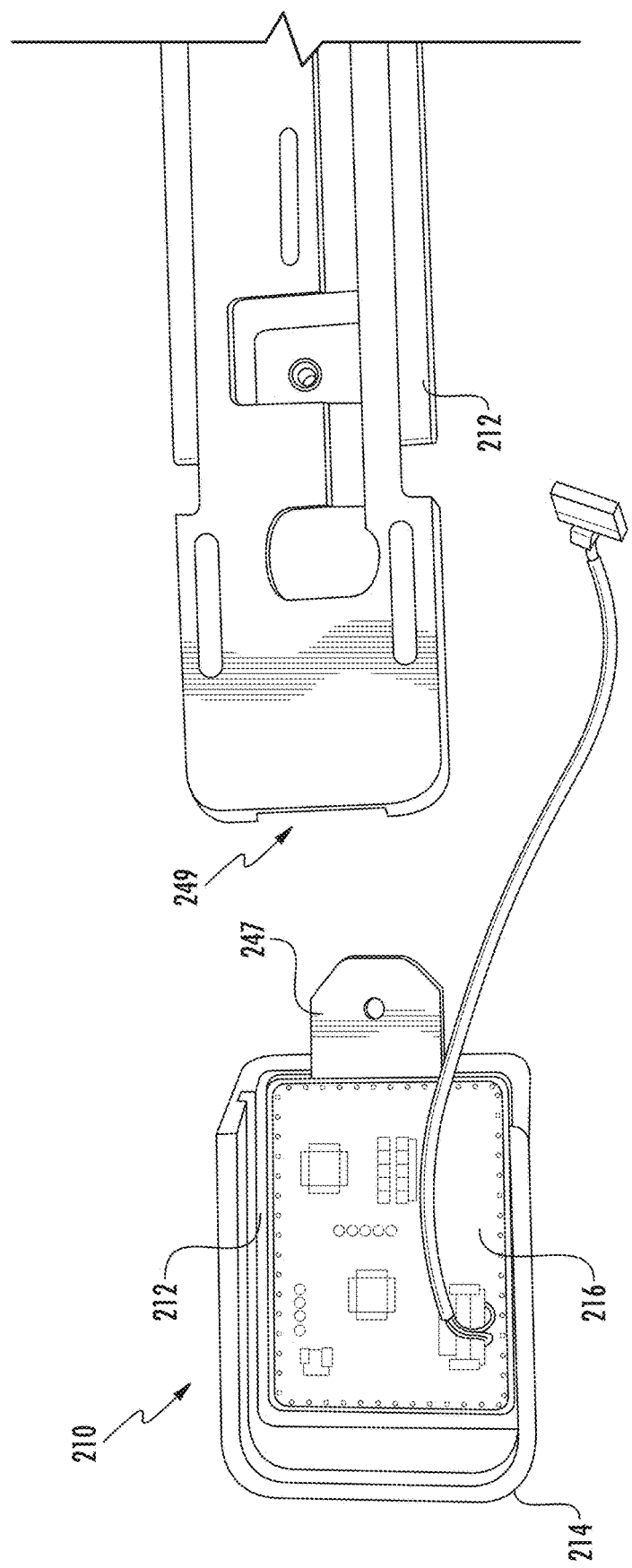
FIG. 10 is a bottom fragmentary perspective view of the upper armrest structure and the track pad assembly of FIG. 9 with the track pad assembly decoupled from the upper armrest structure.

Referring to FIGS. 9 and 10, the escutcheon 214 is releasably coupled to the armcap 212. Specifically, the escutcheon 214 includes a tab 247 that is configured to be received in a groove or slot 249 of the armcap 212. The escutcheon tab 247 may then be fastened to the armcap 212 to couple the two components.

The track pad assembly 210 includes a sensor plate 216 (track pad) that is similar to the sensor plate 116 described above. The sensor 216 may be held in a recessed portion 220 of the escutcheon 214. The sensor 216 may be held in place by an interference fit within the recessed portion 220. Additionally or alternatively, the sensor 216 may be adhered to an inner surface of the escutcheon 214, for example using double sided tape.

The track pad assembly 210 includes a cable 212 to provide power to the track pad and/or to communicate with the other components of the IFE system. The cable 212 may extend from the sensor 216 in the escutcheon 214 through an aperture 242 defined in a bottom surface of the armcap 212. The bottom surface of the armcap may also have a channel or groove 246 defined therein with the cable 212 held in the channel 246. In some embodiments, a major portion of a length of the cable 212 is held in the channel 246. Alternatively, the track pad assembly 210 could include a transceiver to wirelessly communicate with the display or a controller of the system.

The escutcheon 214 may be formed of a plastic or polymeric material. In this regard, the escutcheon 214 does not impact or does not substantially impact the capacitive sensing of the sensor plate 216 (e.g., when a user moves his or her finger over the escutcheon 214).

When assembled and installed on an armrest (FIGS. 2 and 7), the passenger may use the track pad 110 or 210 to perform operations on a video display unit which may be installed in the seatback in front of the passenger. For example, the passenger may operate the track pad 110 or 210 move a cursor on the display (e.g., by moving a finger on the sensor), to scroll through menus or options on the display (e.g., by moving one or more fingers left-right or up-down on the sensor), to select an object on the display (e.g., by tapping once or twice on the sensor), to zoom in or zoom out (e.g., by performing a finger spread gesture or pinching gesture on the display), and to perform other operations that can be performed using a track pad as understood by those skilled in the art.

In some embodiments, the track pad 110 or 210 may be configured to sense electrical, e.g., charge, coupling to a non-contacting adjacent finger. The track pad and/or the IFE may wake up responsive to sensing a proximately located finger. The track pad may track the direction of motion of the sensed non-contacting adjacent finger and provide the direction of movement of the finger to the IFE and/or may identify a gesture formed by a sequence of movements of the finger from among a plurality of known gestures and provide the identified gesture to the IFE.

The track pad 110 or 210 thereby acts as a virtual extension of the passenger's hand to control the video display unit to provide an improved user experience. Again, the track pad may be positioned on the armrest to provide improved comfort as opposed to having to reach to operate a touch-screen interface. Further, unlike some passenger controller units, the track pad is intuitive to many users due to their experience with similar track pads on electronic devices. The intuitive use may allow the passenger to simultaneously operate the track pad and view the video display unit (e.g., rather than repeatedly looking down at the passenger controller unit that may be unfamiliar to the passenger).

In some instances, the track pad may be positioned in an armrest that is between two adjacent passenger seats. According to some embodiments, one or more signals from the track pad and/or one or more other sensors can be used to determine which passenger is using the track pad. In response to the signal, the system can select the seat video display unit (SVDU) in front of the passenger (such as the video display unit 50 in FIG. 1) that is using the track pad so that the track pad controls the operation of the selected SVDU.

Figure 11:
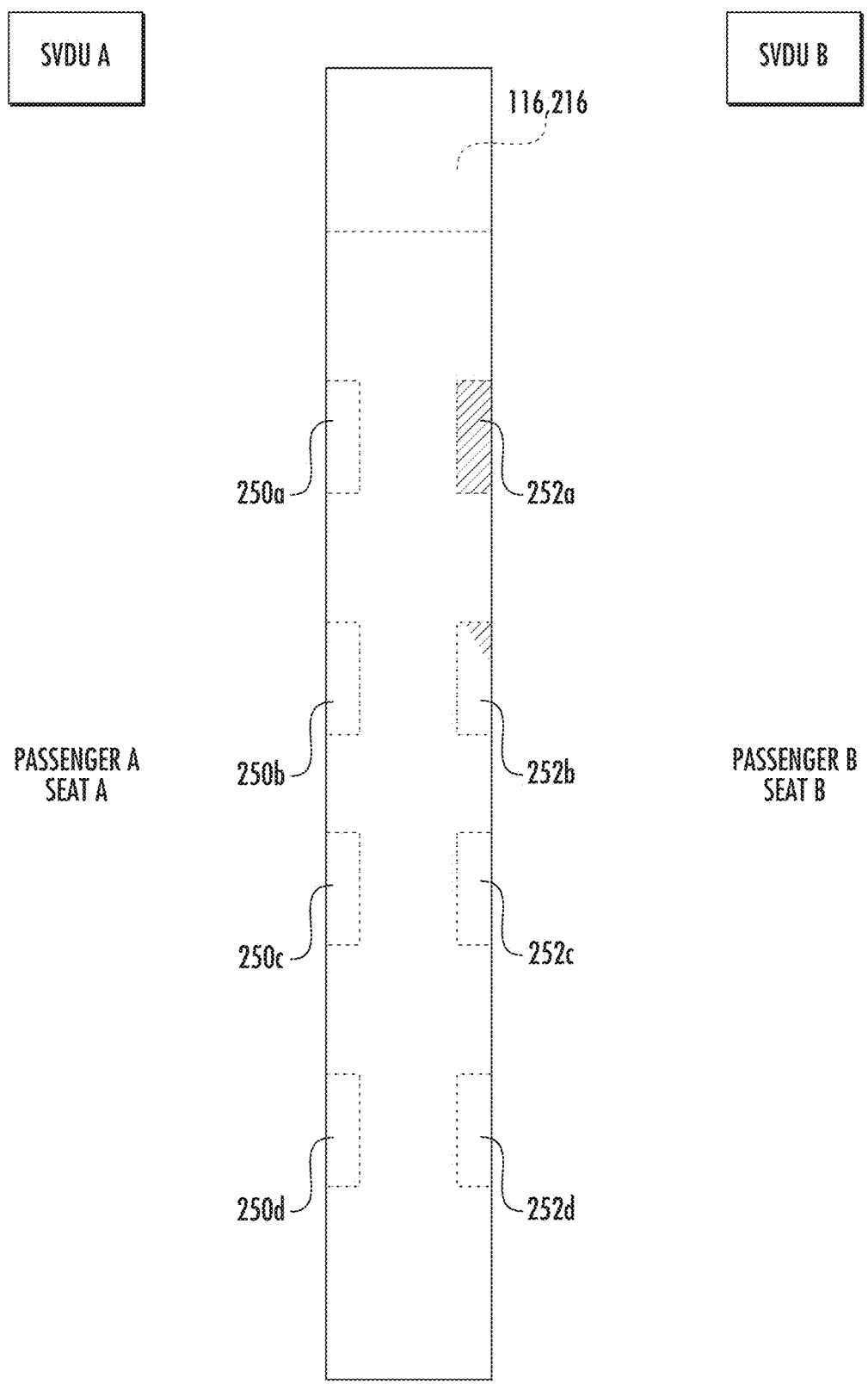
FIG. 11 is a schematic view of an armrest with one or more additional sensors according to some embodiments.

For example, referring to FIG. 11, the track pad sensor 116 or 216 is at the end of the armrest 10. The armrest 10 is between seat A and seat B in which passenger A and passenger B are seated, respectively. A plurality of first spaced apart sensors 250 extend along the armrest 10 on one side of the armrest 10 that is adjacent passenger A and seat A. A plurality of second spaced apart sensors 252 are on the opposite side of the armrest that is adjacent passenger B and seat B. The sensors 250 are positioned and configured to sense contact and/or movement of the palm, forearm or wrist of passenger A as he or she operates the track pad sensor 116 or 216. The sensors 252 are positioned and configured to sense contact and/or movement of the palm, forearm or wrist of passenger B as he or she operates the track pad sensor 116 or 216.

The sensors 250, 252 may be proximity and/or touch sensors such as capacitive sensors that are electrically charged to generate capacitive coupling responsive to a user contacting or hovering over the sensors 250, 252. The sensors 250, 252 may generate a hover or touch signal based on the level of capacitive coupling. The system may compare the relative signals between the sensors 250, 252 to determine which passenger is using the track pad. For example, the system may determine that passenger A is using the track pad if the touch and/or hover signals are higher or stronger for the sensors 250 than for 252, which indicates that one or more of the sensors 250 has a greater capacitive coupling to the body of passenger A, e.g., passenger A's forearm, than any capacitive coupling from a corresponding one or more of the sensors 252 to the body of passenger B.

In some instances, some of the sensors 250 and/or some of the sensors 252 may have capacitive coupling to objects other than the passengers (for example, an adjacent or underlying portion of the armrest). Without compensation, the system may erroneously interpret such capacitive coupling as capacitive coupling to one of the passengers. For example, the sensors 250 may have greater capacitive coupling to the armrest than do the sensors 252, and without compensation, the system may determine that passenger A is operating the track pad.

The sensors 250, 252 may be calibrated to avoid such a scenario. The calibration may be carried out when it is known that the passengers are not seated to ensure that that the sensors are uncoupled from the passengers; for example, the calibration may take place before boarding or after deboarding (disembarking). The system may automatically perform the calibration process, e.g., the system may perform the calibration process after each disembarking event.

The calibration process may define a threshold difference value based on the signals from the sensors 250 and 252 when the passengers are not seated, e.g., decoupled from the sensors 250 and 252. The threshold difference value may then be used for comparison of signals from the sensors 250 and the sensors 252 when the passengers are seated. For example, the sensors 250 may have greater capacitive coupling to the armrest than do the sensors 252 by the threshold difference value that is determined by the system during the calibration process. Then, when the passengers are seated, the system will only determine that passenger A is operating the track pad if the signal from sensors 250 is greater than the signal from sensors 252 by more than the threshold difference value. It is contemplated that individual sensors in the sensor groups 250, 252 may be calibrated in a similar way as described above. For example, threshold difference value(s) may be defined based on the signals from two or more of the sensors 250a-d.

The system may also compare relative signals from each of the groups of sensors 250, 252 to determine which passenger is using the track pad. For example, the sensor 252a closest to the track pad may generate a hover or touch signal and the sensor 252b adjacent the sensor 252a may generate a weaker hover or touch signal. This may indicate an angle of approach of the arm or hand of passenger B. For example, while passenger B is using the track pad sensor 116 or 216, the palm of passenger B may be contacting or hovering over a relatively large area or portion of the sensor 252a and the wrist of passenger B may be contacting or hovering over a lesser portion of the sensor 252b (for example, only over the upper right hand corner of the sensor 252b as illustrated in FIG. 11). In addition, the wrist of passenger B may be hovering over sensor 252b a greater distance than the palm of passenger B is hovering over sensor 252a. The sensors 252c and 252d may also be used to determine the angle of approach for passenger B (e.g., to sense the forearm of the user). In this scenario, absence of capacitive coupling between the corresponding sensors 250 to passenger A indicates that passenger B is using the track pad. Likewise, the sensors 250a-d may be used to sense an angle of approach for passenger A to determine that passenger A is using the track pad.

In response to the stronger signals for the sensors 250 and/or an angle of approach based on the signals from the sensors 250, the system (or a controller thereof) is configured to select SVDU A that is in front of passenger A such that the track pad controls the operation of SVDU A. In response to sensing stronger signals for the sensors 252 and/or an angle of approach based on the signals from the sensors 252, the system (or a controller thereof) is configured to select SVDU B that is in front of passenger B such that the track pad controls the operation of SVDU B.

Figure 12A:
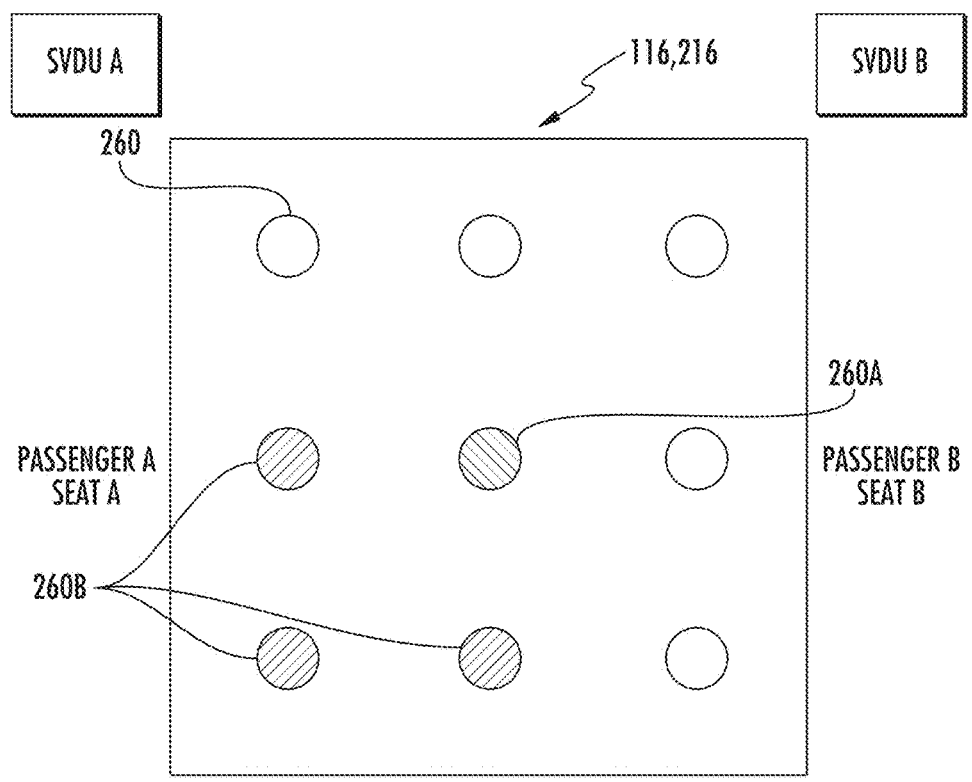
FIGS. 12A and 12B are schematic views of a track pad according to embodiments described herein with sensor elements or plates configured to sense the direction of approach of a hand according to some embodiments.
Figure 12B:
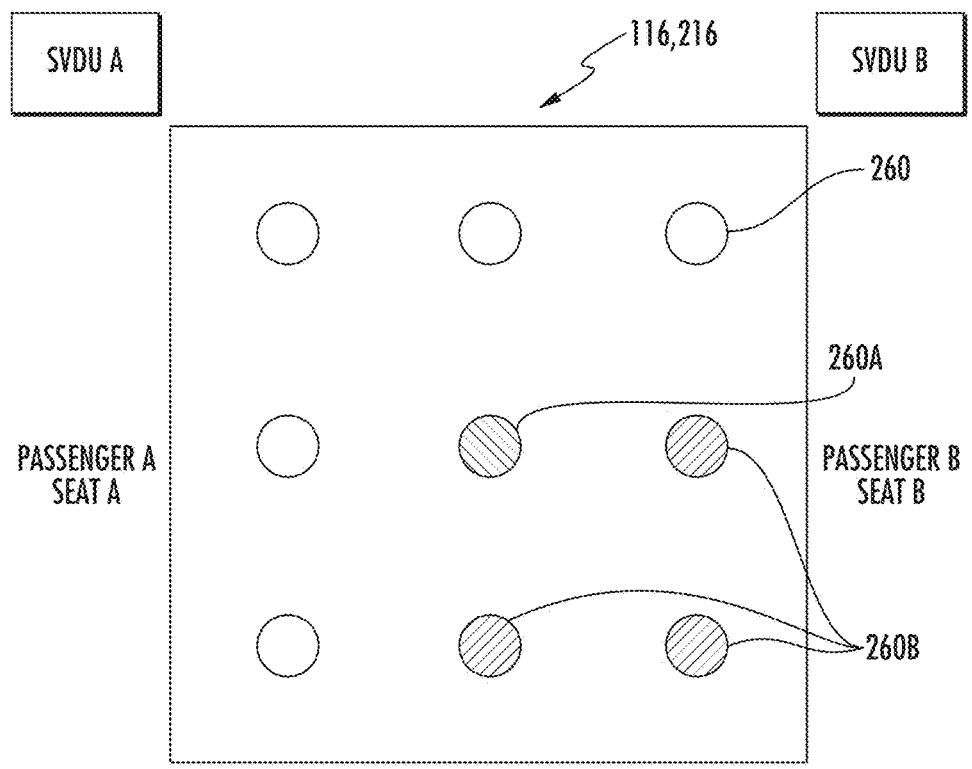
Figure 13:
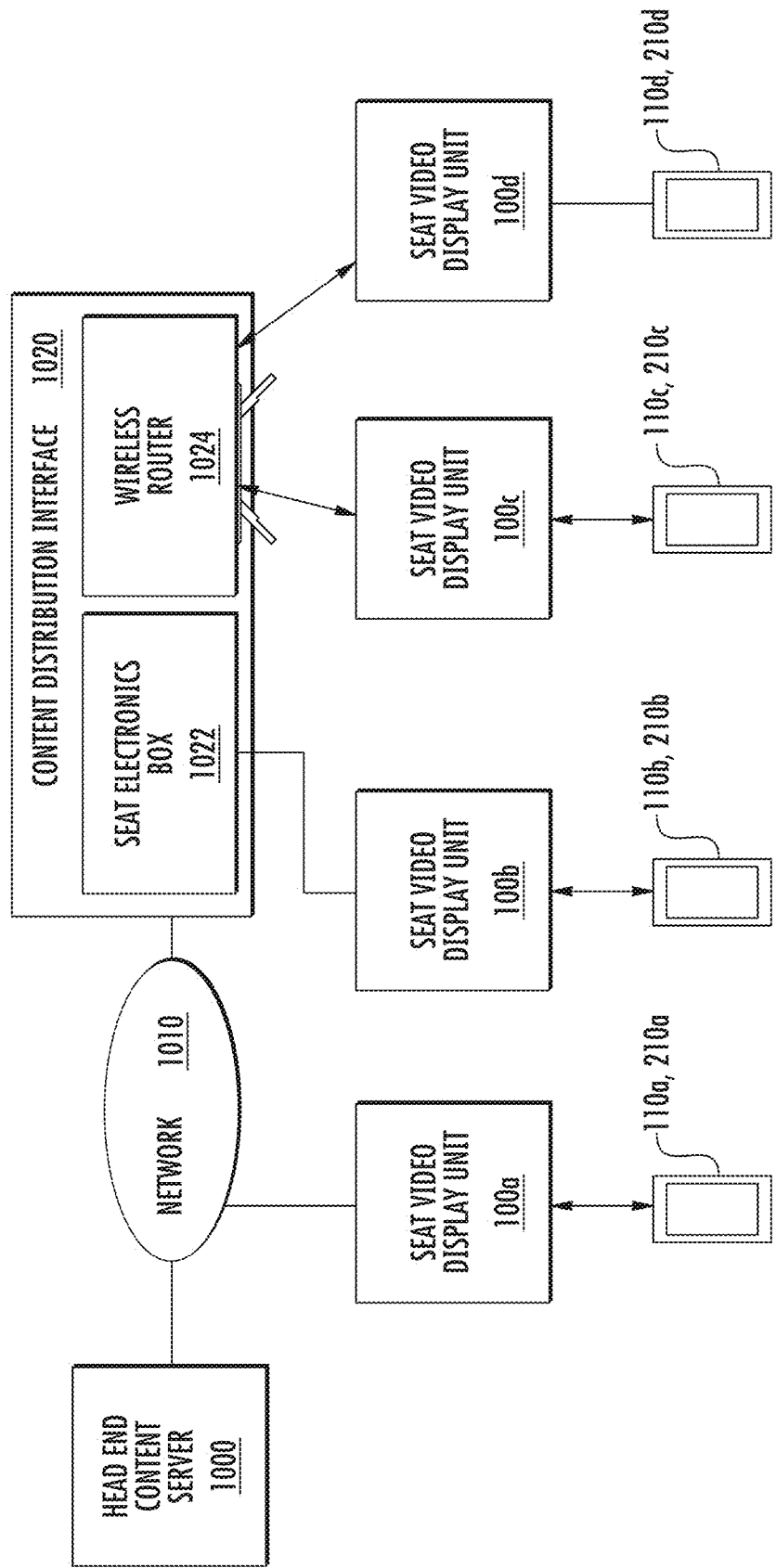
FIG. 13 is a block diagram of an entertainment system that includes video display units controlled by pointing devices which are configured according to some embodiments.
Figure 14:
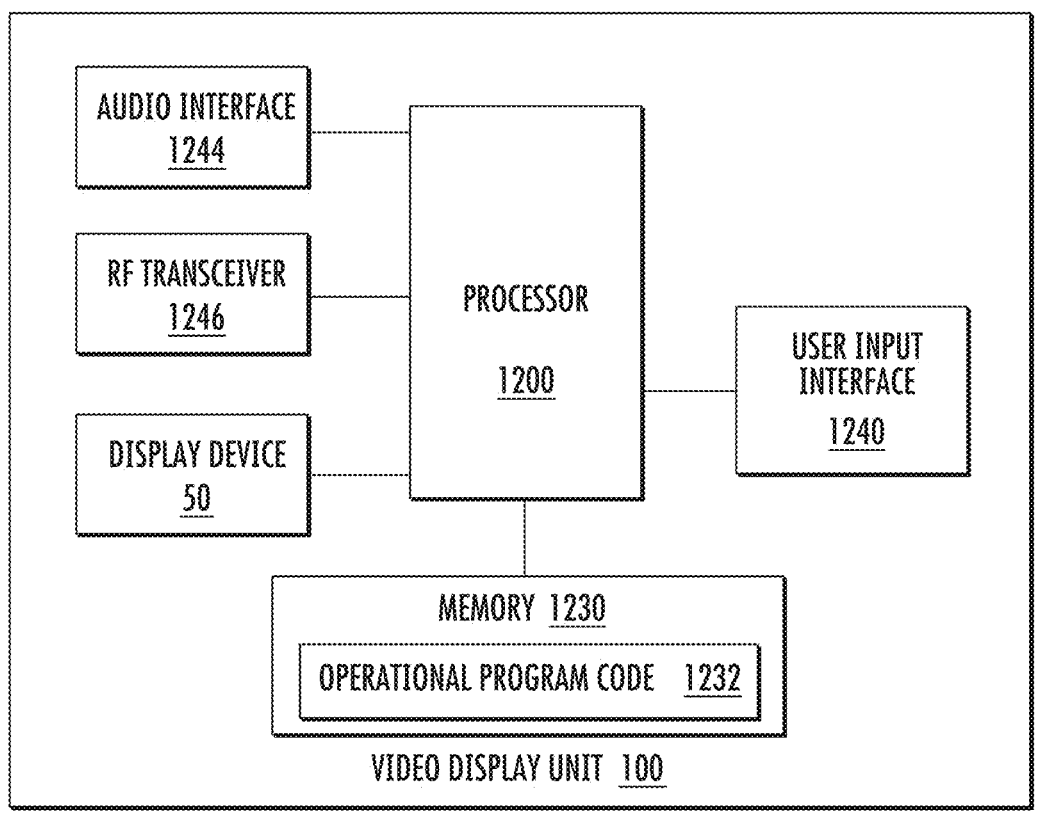
FIG. 14 is a block diagram of a video display unit that is configured according to some embodiments.
Figure 16:
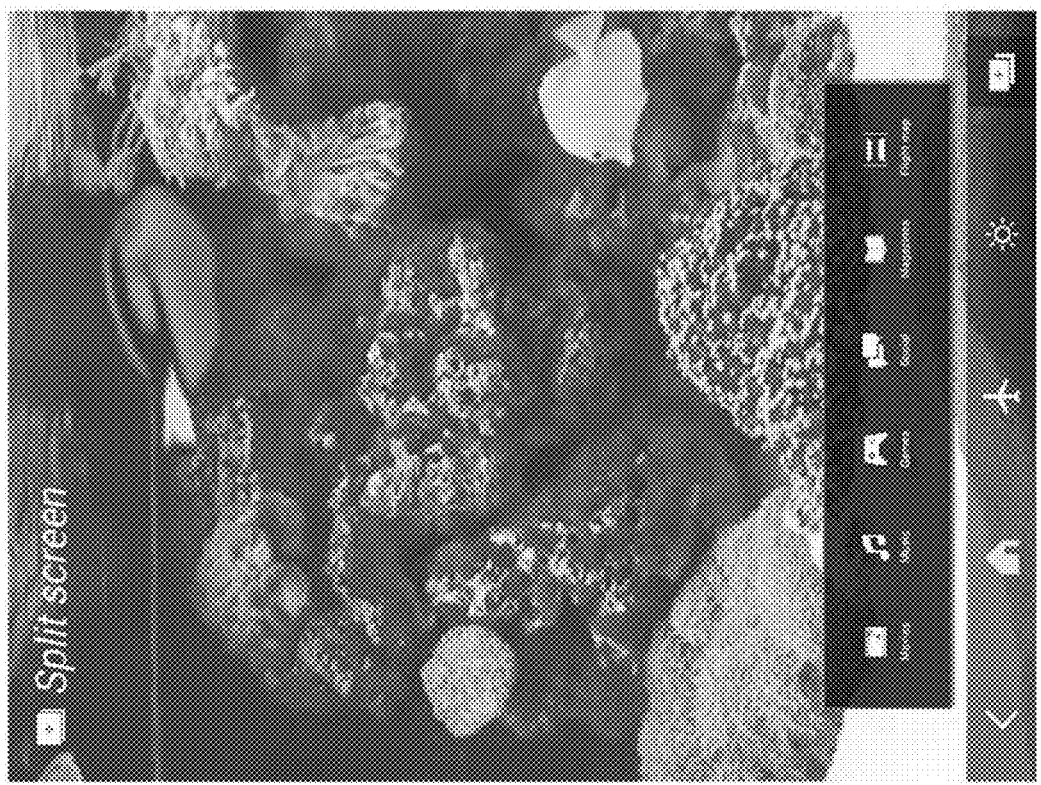
FIGS. 15-22 illustrate example operations that a passenger can perform using a pointing device in accordance with some embodiments.
Figure 15:
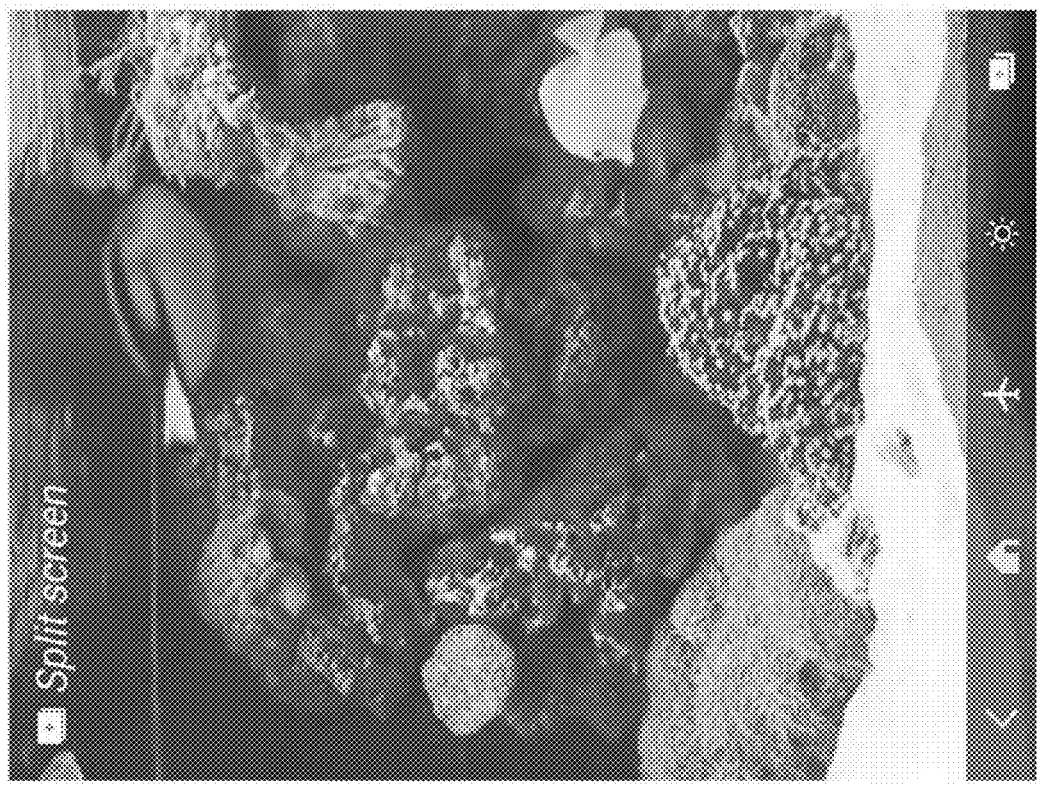
Figure 17:
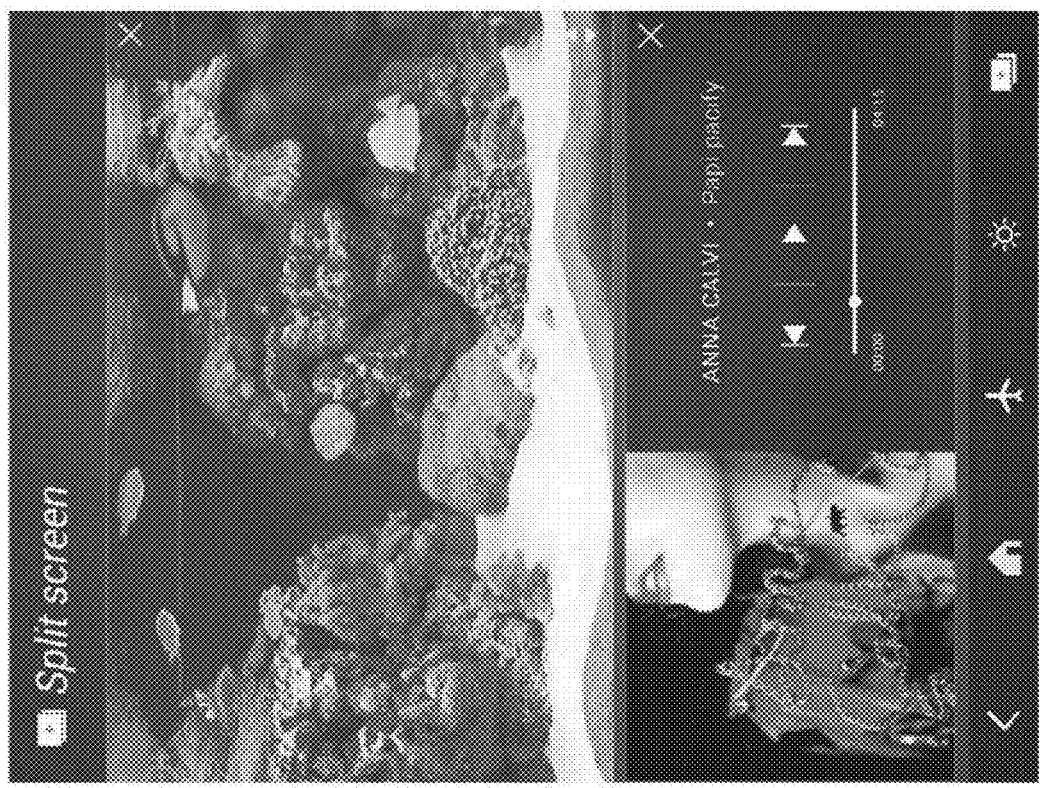
Figure 18:
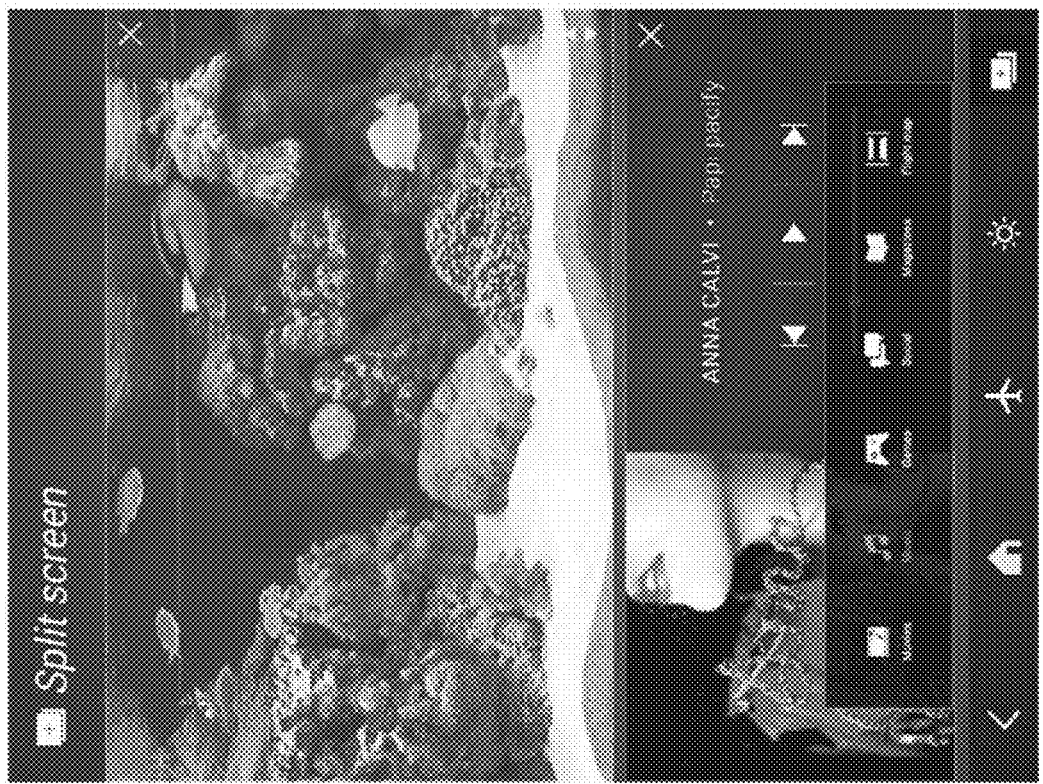
Figure 19:
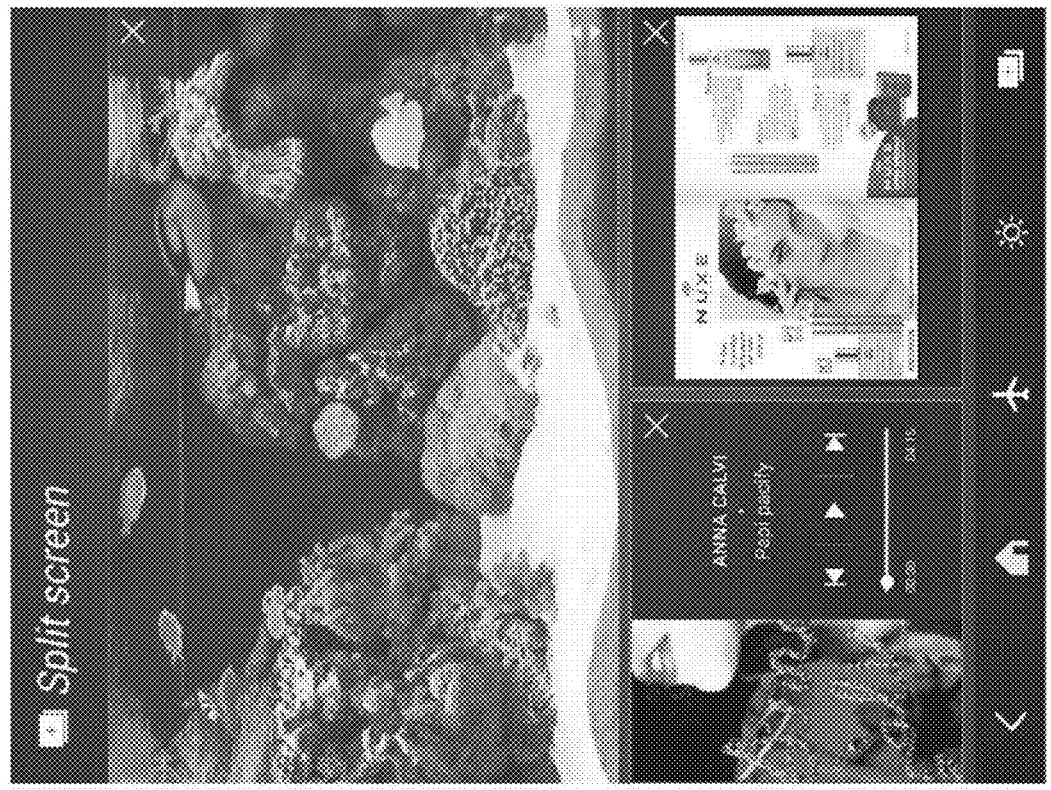

Additionally or alternatively, signals from the track pad sensor 116 or 216 can be used to determine which passenger is operating the track pad. Referring to FIGS. 12A and 12B, the track pad sensor 116 or 216 includes a plurality of proximity detector elements or plates 260 arranged in a pattern or coordinate system. The plates 260 are electrically charged to generate capacitive coupling to a user's finger and operates to determine therefrom a location (e.g., coordinates) of the user's finger that is contacting the sensor 116 or 216. At the same time, the sensor 116 and 216 also determines a location (e.g., coordinates) of the user's finger or other portion of the user's hand that is hovering over the sensor but not contacting the sensor.

In this regard, the sensor 116 or 216 is operative to sense an approach angle and/or a location of hovering so that it can be determined which passenger is operating the touch pad. In FIG. 12A, a user's finger is contacting the sensor at or adjacent capacitive coupling plate 260A to generate a touch selection signal. The user's finger and/or hand is also hovering over the capacitive coupling plates 260B that are adjacent passenger A to generate a hover signal which indicates that passenger A is operating the touch pad. In response to these signals, the system (or a controller thereof) is configured to select SVDU A that is in front of passenger A such that the track pad controls the operation of SVDU A. In FIG. 12B, a user's finger is contacting the sensor at or adjacent capacitive coupling plate 260A to generate a touch selection signal. The user's finger and/or hand is also hovering over the capacitive coupling plates 260B that are adjacent passenger B to generate a hover signal which indicates that passenger B is operating the touch pad. In response to these signals, the system (or a controller thereof) is configured to select SVDU B that is in front of passenger B such that the track pad controls the operation of SVDU B.

The signals from the capacitive coupling plates 260 may also be used to determine an angle of approach to indicate that either passenger A or passenger B is operating the track pad. For example, in FIG. 12A, the hover signal(s) generated by the plates 260B are indicative of an angle of approach from seat A, and in response the system (or controller thereof) may select SVDU A that is in front of passenger A such that the track pad controls the operation of SVDU A. Also, in FIG. 12B, the hover signal(s) generated by the plates 260B are indicative of an angle of approach from seat B, and in response the system (or controller thereof) may select SVDU B that is in front of passenger B such that the track pad controls the operation of SVDU B.

The pointing devices according to embodiments described herein may be particularly useful for large format displays that provide multiple window options as described in co-owned and co-pending U.S. Patent Application entitled "VIDEO DISPLAY UNIT CASSETTE ASSEMBLIES FOR AIRCRAFT SEATS AND ENHANCED IN FLIGHT ENTERTAINMENT USER EXPERIENCE," Ser. No. 15,091,272, filed Apr. 5, 2016, the disclosure of which is incorporated by reference herein in its entirety. In various embodiments, the video display unit 50 (FIG. 1) may have a diagonal length of at least 20 inches, about 22 inches, at least 25 inches and about 27 inches.

Figure 20:
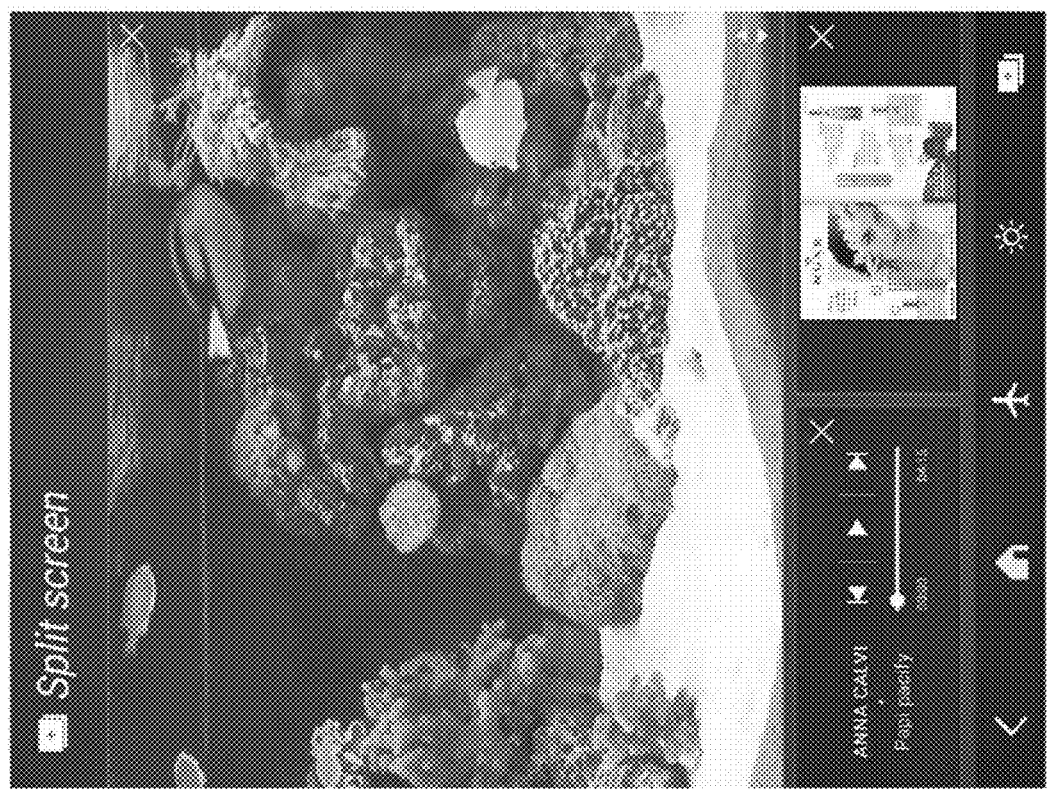
Figure 22:
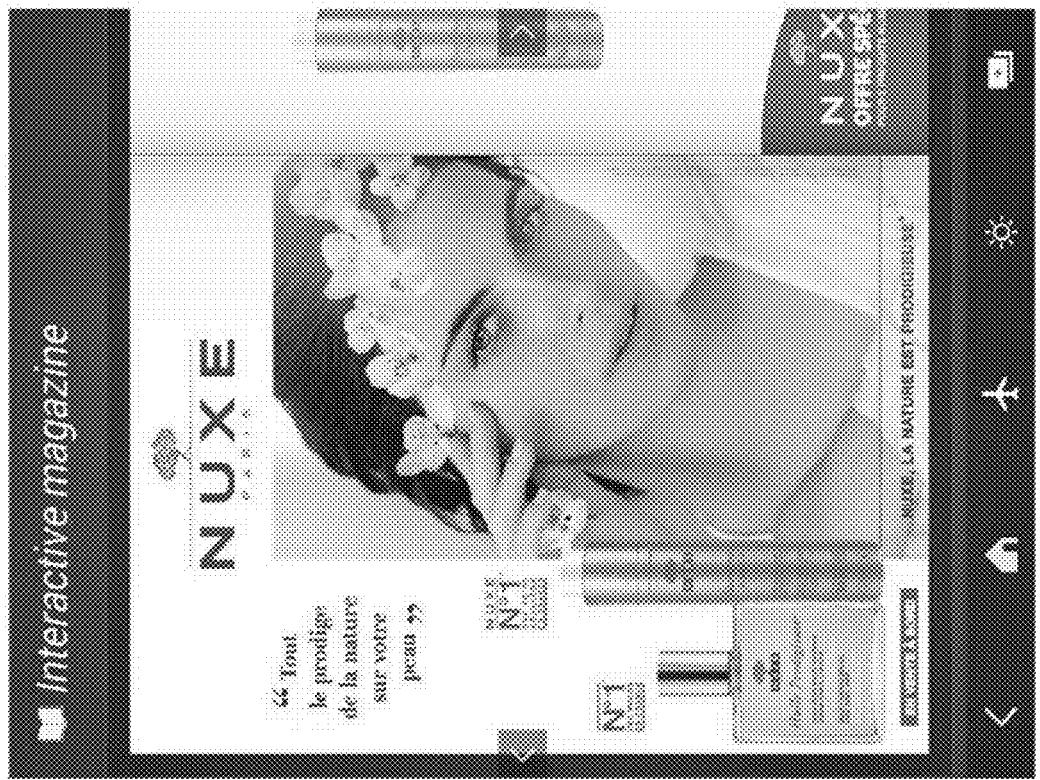
Figure 21:
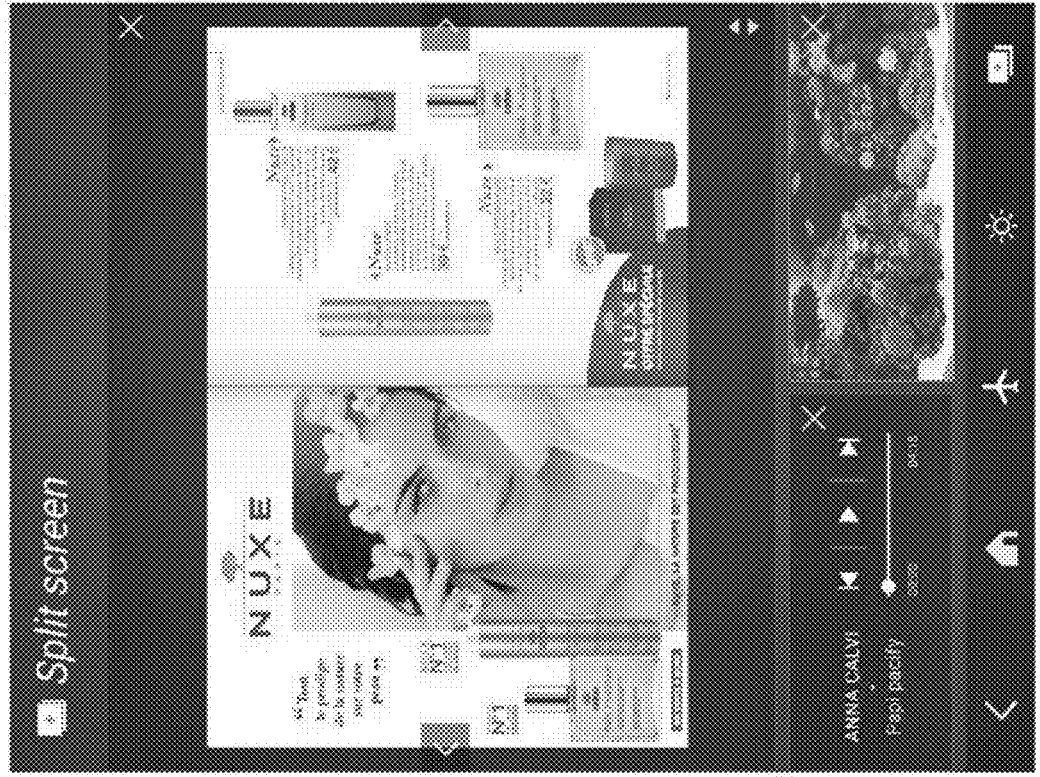

For example, referring to FIGS. 15-22, the large format portrait display provides enhanced multiple window or split screen functionality, and the pointing devices described herein may be useful in operating the display. The passenger may operate the pointing device to select the split screen icon such that an application panel is displayed. The passenger may operate the pointing device to select one of the applications such that the selected application appears in a different window (e.g., the music application shown in FIG. 17). The passenger may operate the pointing device to select another one of the applications such that the selected application appears in a further different window (e.g., the interactive magazine shown in FIG. 19). Referring to FIG. 20, the passenger may operate the pointing device to change the size or shape of one or more of the windows (e.g., by selecting an arrow in the window or by tapping and dragging an edge portion of the window). In addition, the passenger may change the position of the windows. For example, the passenger may operate the pointing device to move the interactive magazine to the top window as shown in FIG. 21 (e.g., by tapping or double tapping on the interactive magazine). The passenger may then change the interactive magazine to full screen mode by, for example, tapping or double tapping the interactive magazine again.

Various embodiments described herein include a pointing device integrated into a passenger seat armrest. However, it is also contemplated that the pointing device could be provided in any suitable location within an aircraft interior to provide comfortable and/or intuitive control of an IFE video display unit. For example, the pointing device could be in alternative locations around a seat occupant such as in a sideboard, a dashboard, a sidewall or an ottoman.

Example Entertainment System with Video Display Units:

FIG. 6 is a block diagram of an entertainment system that includes pointing devices 110a-d, seat video display units (SVDUs) 100a-d, and other system components which are configured according to some embodiments of the present invention. Referring to FIG. 6, the system includes a head end content server 1000 that contains content that can be downloaded to the SVDUs 100a-d through a data network 1010 and a content distribution interface 1020. The content distribution interface 1020 can include seat electronics boxes 1022, each of which can be spaced apart adjacent to different groups of seats, and/or a wireless router 1024.

Example content that can be downloaded from the head end content server 1000 can include, but is not limited to, movies, TV shows, other video, audio programming, and application programs (e.g., game programs). The wireless router 1024 may be a WLAN router (e.g., IEEE 802.11, WIMAX, etc), a cellular-based network (e.g., a pico cell radio base station), etc.

The SVDUs 100a-d are connected to request and receive content from the head end content server 1000 through a wired and/or wireless network connections through the content distribution interface 1020.

When used in an aircraft environment, the SVDUs 100a-d can be attached to seatbacks so that they face passengers in a following row of seats. The pointing devices 110a-d or 210a-d may be connected to a corresponding one of the SVDUs 100a-d through a wireless RF channel (e.g., WLAN peer-to-peer, Bluetooth, etc.) or may be tethered by a cable (e.g. wire/communication cable) to an associated one of the SVDUs. For example, pointing devices 110a-c or 210a-c are connected through wireless RF channels to respective SVDUs 100a-c. The pointing device 110d or 210d is connected through a wired communication cable (e.g., serial communication cable) to the SVDU 100d.

In accordance with some embodiments, a passenger can operate a pointing device 110 or 210 to control what content is displayed and/or how the content is displayed on the associated SVDU 100. For example, a passenger can operate the pointing device 110b or 210b to select among movies, games, audio program, and/or television shows that are listed on the SVDU 100b, and can cause a selected movie/game/audio program/television show to be played on the SVDU 100b.

Each of the pointing devices 110a-d or 210a-d in the IFE system may be assigned a unique network address (e.g., media access control (MAC) address, Ethernet address). In addition, the SVDUs 100a-d may be each assigned a unique network address (e.g., MAC address, Ethernet address) which are different from the network addresses of the respective communicatively coupled pointing devices 110a-d. In some embodiments, a pointing device 110b or 210b and a SVDU 100b may be coupled with a same seat-end electronics box 1022 (when utilized by the system) that functions as a local network switch or node to provide network services to SVDUs at a group of passenger seats, for example a row of seats. In other embodiments, the pointing device 110b or 210b and the respective SVDU 100b may be coupled with different seat-end electronics boxes 1022 (when utilized by the system). For example, a pointing device 110 or 210 for use by a passenger in an aircraft seat identified by a passenger readable identifier (e.g., a printed placard) as seat "14B" may be attached to a seat electronics box 1022a that provides network connections to row "14", while the SVDU 100b installed in the seat back in front of seat "14B" for use by the passenger in seat "14B" may be attached to a different seat electronics box 1022b that provides network connections to row "13."

Figure 7:
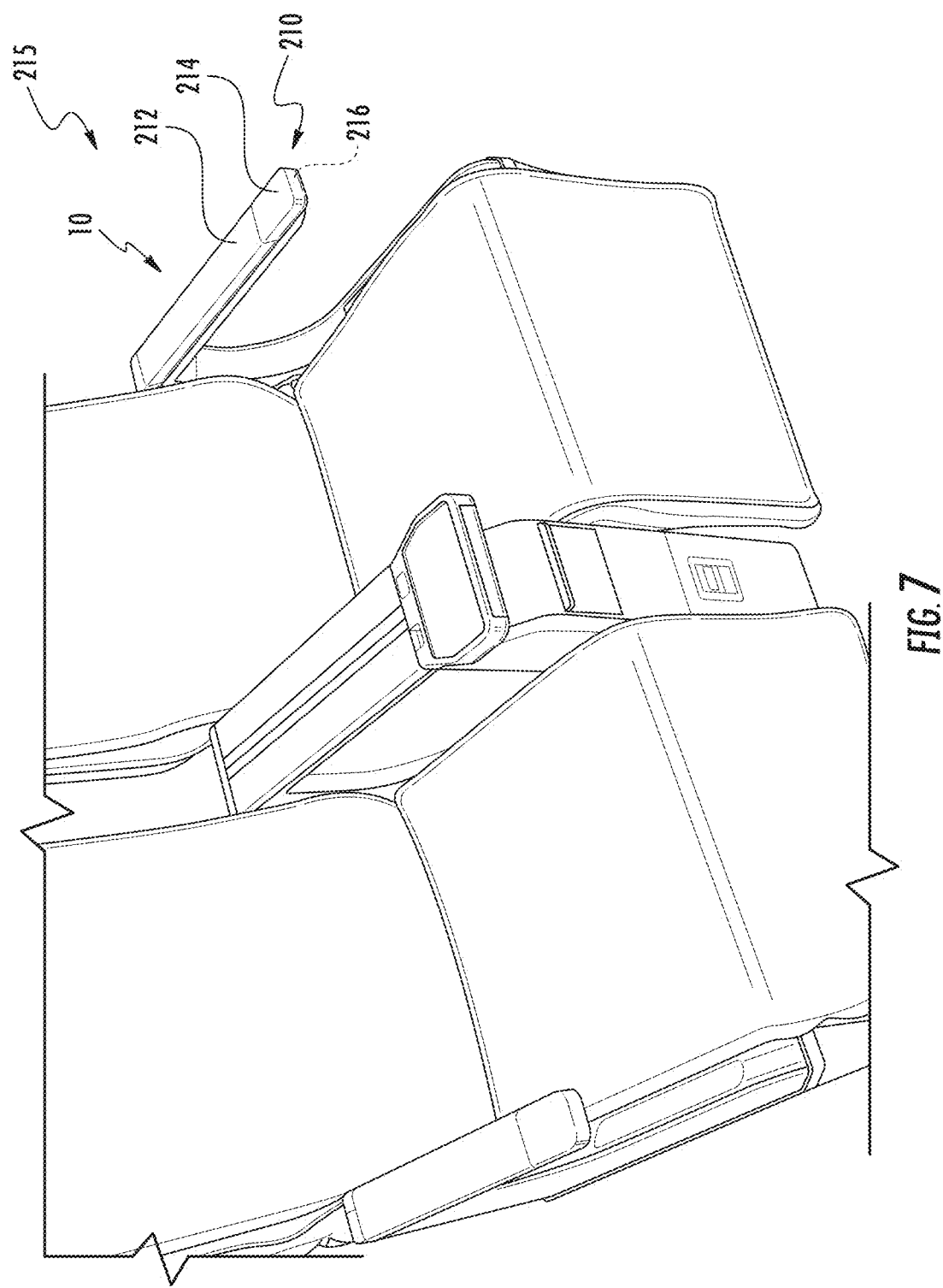
FIG. 7 is a fragmentary perspective view of an aircraft seat with a track pad assembly according to some other embodiments integrated into an armrest of the aircraft seat.

Example Video Display Unit:

FIG. 7 illustrates a block diagram of a video display unit 100 that is configured according to some embodiments. The video display unit 100 may include a RF transceiver 1246, a display device 1202, and a processor 1200 that executes computer program code from a memory 1230. The RF transceiver 1246 may be configured to communicate through a wireless RF channel with a pointing device 110 or 210 (e.g., that is used by a passenger). The video display unit 100 may further include an additional user input interface 1240 (e.g., touch screen, keyboard, keypad, etc.) and an audio interface 1244 (e.g., audio jack and audio driver circuitry).

The processor 1200 includes one or more data processing circuits, such as a general purpose and/or special purpose processor (e.g., microprocessor and/or digital signal processor). The processor 1200 is configured to execute computer program instructions from operational program code 1232 in a memory 1230, described below as a computer readable medium, to perform some or all of the operations and methods that are described herein for one or more of the embodiments.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. An entertainment system comprising:
    a video display unit facing a passenger seat;
    a track pad assembly integrated with an armrest of the passenger seat, the track pad assembly comprising a track pad that is operable to control the video display unit,
    wherein the armrest comprises a lower structure and an upper structure coupled to the lower structure, and wherein the track pad is positioned between the lower structure and the upper structure, and
    wherein the upper structure comprises an escutcheon at an end of the armrest and an arm pad adjacent the escutcheon, and wherein the track pad is positioned under the escutcheon.

2. The entertainment system of claim 1 wherein the escutcheon is polymeric.

3. The entertainment system of claim 1 wherein an underside of the escutcheon comprises a recessed portion and the track pad is held within the recessed portion.

4. The entertainment system of claim 1 wherein the track pad is adhered to an underside of the escutcheon.

5. The entertainment system of claim 1 wherein the video display is held in a seatback of another passenger seat that is directly in front of the passenger seat.

6. The entertainment system of claim 5 wherein the video display has a diagonal length of at least 20 inches.

7. The entertainment system of claim 1 wherein the entertainment system comprises an in-flight entertainment system on an aircraft.

8. An entertainment system comprising:
    a video display unit facing a passenger seat;
    a track pad assembly integrated with an armrest of the passenger seat, the track pad assembly comprising a track pad that is operable to control the video display unit,
    the passenger seat is a first passenger seat;
    the video display unit is a first video display unit that is held in a seatback of another passenger seat that is directly in front of the first passenger seat;
    the entertainment system further comprises:
        a second passenger seat that is adjacent the first passenger seat;
        a second video display unit that is held in a seatback of another passenger seat that is directly in front of the second passenger seat; and
        a processor;
    the armrest is positioned between the first and second passenger seats; and
    the processor is configured to:
        determine whether a passenger in the first passenger seat or a passenger in the second passenger seat is operating the track pad in response to one or more signals from the track pad and/or one or more sensors in the armrest;
        select the first video display unit such that the track pad controls the first video display unit in response to determining that the passenger in the first passenger seat is operating the track pad; and
        select the second video display unit such that the track pad controls the second video display unit in response to determining that the passenger in the second passenger seat is operating the track pad.

9. The entertainment system of claim 8 wherein the processor is configured to determine whether a passenger in the first passenger seat or a passenger in the second passenger seat is operating the track pad in response to one or more signals from the track pad indicating an angle of approach of a passenger's hand.

10. The entertainment system of claim 9 wherein:
    the processor is configured to determine that a passenger in the first passenger seat is operating the track pad in response to detecting touch and/or hover signals from capacitive coupling plates in the track pad that are closer to the first passenger seat than the second passenger seat; and
    the processor is configured to determine that a passenger in the second passenger seat is operating the track pad in response to detecting touch and/or hover signals from capacitive coupling plates in the track pad that are closer to the second passenger seat than the first passenger seat.

11. The entertainment system of claim 8 wherein the one or more sensors in the armrest comprise a first set of aligned and spaced apart sensors on one side of the armrest adjacent the first passenger seat and a second set of aligned and spaced apart sensors on an opposite side of the armrest adjacent the second seat.

12. The entertainment system of claim 11 wherein the processor is configured to determine whether a passenger in the first passenger seat or a passenger in the second passenger seat is operating the track pad in response to one or more signals from the one or more sensors in the armrest indicating an angle of approach of a passenger's hand.

13. The entertainment system of claim 12 wherein:
    the processor is configured to determine that a passenger in the first passenger seat is operating the track pad in response to detecting a first touch and/or hover signal from a first sensor in the first set of sensors and to detecting a second touch and/or hover signal that is weaker than the first touch and/or hover signal from a second sensor in the first set of sensors that is further away from the track pad than is the first sensor in the first set of sensors; and
    the processor is configured to determine that a passenger in the second passenger seat is operating the track pad in response to detecting a first touch and/or hover signal from a first sensor in the second set of sensors and to detecting a second touch and/or hover signal that is weaker than the first touch and/or hover signal from a second sensor in the second set of sensors that is further away from the track pad than is the first sensor in the second set of sensors.

14. The entertainment system of claim 11 wherein:
    the processor is configured to determine that a passenger in the first passenger seat is operating the track pad in response to detecting that an overall strength of touch and/or hover signals from the first set of sensors is stronger than an overall strength of touch and/or hover signals from the second set of sensors; and
    the processor is configured to determine that a passenger in the second passenger seat is operating the track pad in response to detecting that an overall strength of touch and/or hover signals from the second set of sensors is stronger than an overall strength of touch and/or hover signals from the first set of sensors.

15. The entertainment system of claim 11 wherein:
- the processor is configured to determine a threshold difference value between an overall strength of signals from the first set of sensors and an overall strength of signals from the second set of sensors during a calibration process that takes place when passengers are not seated in the first and second passenger seats;
- the processor is configured to compare an overall strength of signals from the first set of sensors and an overall strength of signals from the second set of sensors when passengers are seated in the first and second passenger seats using the threshold difference value; and
- the processor is configured to determine whether the passenger in the first passenger seat or the passenger in the second passenger seat is operating the track pad in response to the comparison.

* * * * *